Nov. 11, 1969    F. G. WARRICK    3,477,732
SPACER-EXPANDER
Filed April 14, 1965    5 Sheets-Sheet 1

INVENTOR.
FRANK G. WARRICK
BY
Barnes, Kisselle, Raisch & Choate
ATTORNEYS

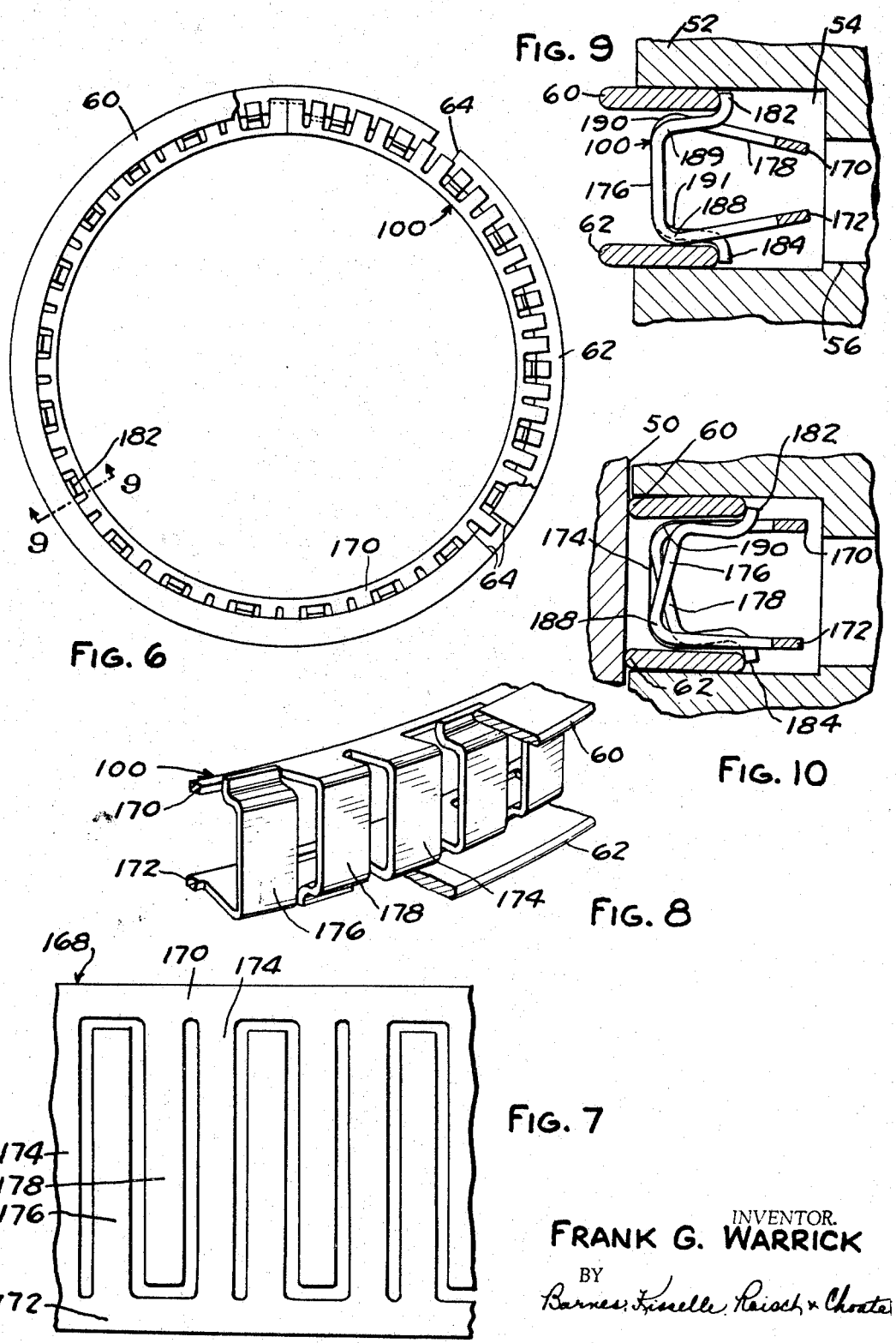

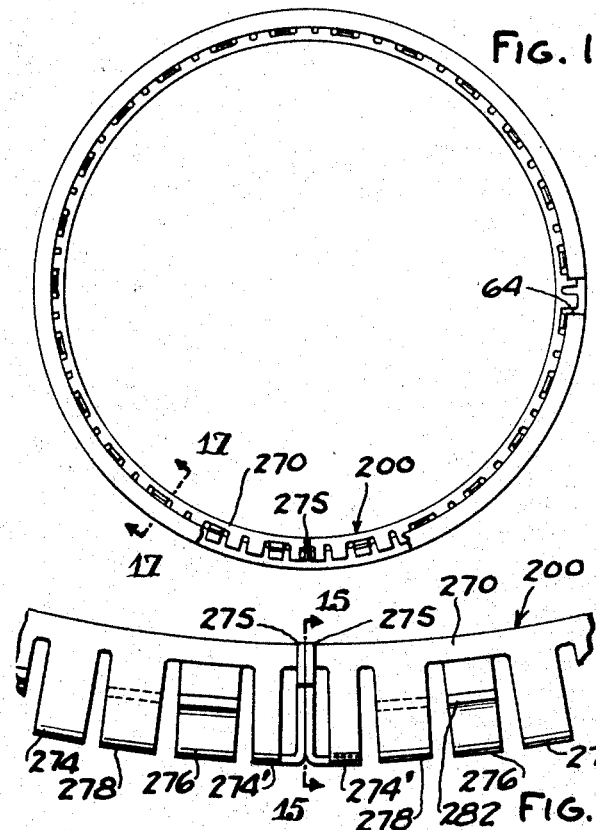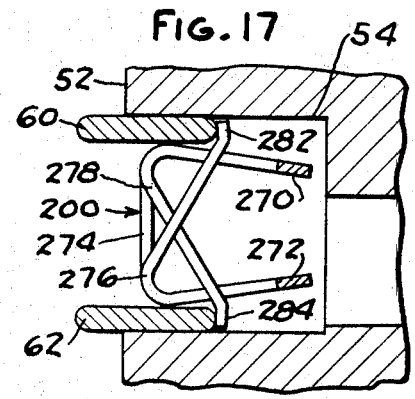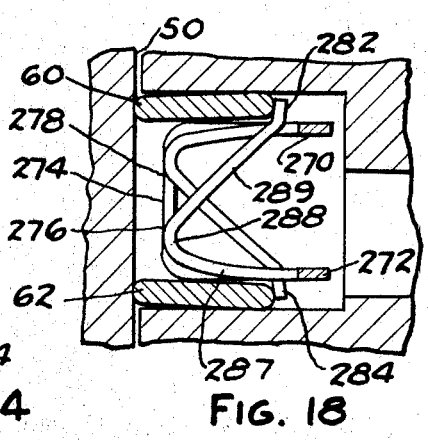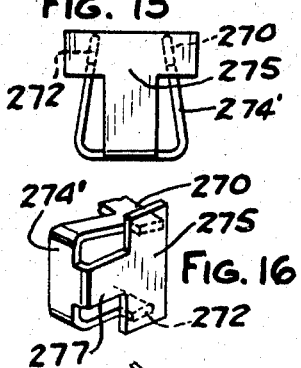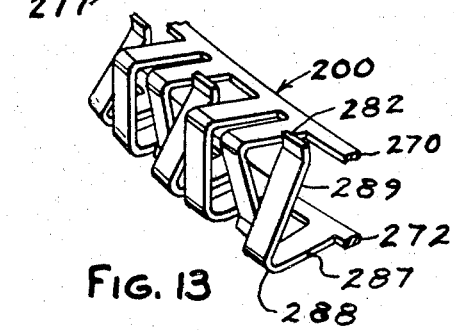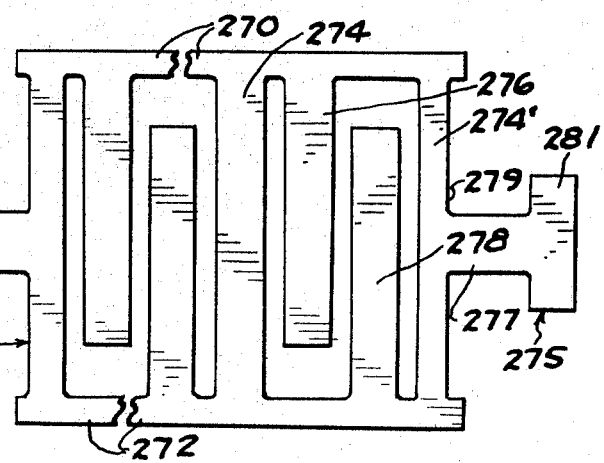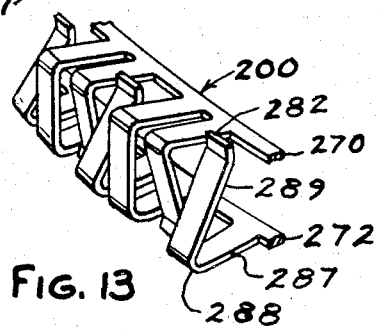

Nov. 11, 1969 F. G. WARRICK 3,477,732
SPACER-EXPANDER
Filed April 14, 1965 5 Sheets-Sheet 4

INVENTOR.
FRANK G. WARRICK
BY
Barnes, Kisselle, Raisch & Choate
ATTORNEYS

Nov. 11, 1969   F. G. WARRICK   3,477,732
SPACER-EXPANDER
Filed April 14, 1965   5 Sheets-Sheet 5

INVENTOR.
FRANK G. WARRICK
BY
Barnes, Kisselle, Raisch & Choate
ATTORNEYS

United States Patent Office 3,477,732
Patented Nov. 11, 1969

3,477,732
SPACER-EXPANDER
Frank G. Warrick, Muskegon, Mich., assignor to Sealed Power Corporation, Muskegon, Mich., a corporation of Michigan
Filed Apr. 14, 1965, Ser. No. 448,059
Int. Cl. F16j 9/06, 15/56
U.S. Cl. 277—140                                       30 Claims

ABSTRACT OF THE DISCLOSURE

A non-bottoming type piston oil ring assembly for an internal combustion engine piston comprising at least one but preferably two split piston rings, usually in the form of oil scraping rails, and a novel one-piece spacer-expander. The spacer-expander has at least one annular substantially circumferentially incompressible band arranged generally concentric with the ring and extending substantially 360 degeres so that in the operative condition of the spacer-expander its circumferential dimension is fixed. The spacer-expander also has a plurality of ring supports circumferentially spaced along the band for locating the ring adjacent one side wall of the piston groove and which support the band in spaced relation with the side walls of the groove. A plurality of spring legs are circumferentially spaced along the band, each leg having a free end engaging the ring to bias the same radially outwardly and a connection between the other end of the leg and the band spaced axially from the ring between the ring and the other side wall of the groove.

In a preferred form of the ring assembly, the spring legs are arranged in two sets to act respectively on top and bottom rails of a dual rail oil ring assembly, the legs being distributed circumferentially and evenly around the ring to provide a multiplicity of substantially independently acting pressure points on the rails. The legs extend oppositely relative to one another from their free ends generally axially across the groove between the top and bottom walls thereof, and also extend generally radially to their connection with the band or bands of the spacer-expander. Hence the legs are each disposed coplanar with the axis of the ring assembly, and in addition are proportioned relative to the band and supports of the expander-spacer so that substantially all of the material in the spacer-expander is stress deflected to store energy for biasing the rails when the spring legs are deflected to their operative condition by the associated rails being contracted to operative diameter.

---

This invention relates to piston rings and more particularly to an improved expander and spacer-expander adapted to be used with a thin metallic rail of a piston oil ring assembly for an internal combustion engine.

At one time virtually all oil rings were made of cast iron or similar material with slots milled or turned on the outer periphery to form scraping members and vents milled radially through to permit oil passage through the ring. Such oil rings are still used to some extent at the present time. However, they are unsuitable for modern high speed engines for a number of reasons. They are heavy, expensive to manufacture, difficult to chrome plate, lacking in flexibility, and have low radial wall pressure due to the low strength of the materials used. Furthermore, they do not seal effectively at high vacuums, resulting in excessive oil consumption when used in modern high speed engines which operate at high vacuum a considerable portion of the time.

The deficiencies of cast iron types of oil rings have led to the development over a number of years of a large number of different designs of formed steel oil rings, often consisting of two steel rails, usually chrome plated, located at the top and bottom of the oil ring groove respectively and separated by a circumferentially compressible spacer-expander abutted at the ends. The spacer-expander serves to maintain the rails in their proper position in the groove and exerts upon them a more or less uniform radial force which results from the circumferential compression of the spacer-expander. This type of oil ring is notably superior in many respects to the machined cast iron oil rings, especially where high engine speeds and high manifold vacuums are encountered. Generaly speaking the formed steel oil rings are lighter, cheaper, easily chrome plated on the periphery of the rails for wear resistance, more flexible, and able to provide much higher radial wall pressure owing to the superior strength of the materials used and the low axial width of the rails used. Further, by designing such spacer-expanders to exert an axial force against the inner portion of the rails as well as a radial force, such oil rings can be made to seal effectively against the sides of the ring groove at high vacuums, resulting in greatly reduced oil consumption where this condition is frequently encountered, as in modern high speed automotive engines.

Although circumferentially compressible spacer-expander and rail type oil rings have been shown to be superior to their predecessors, they have substantial faults which are inherent in the concept of a circumferentially compressible spacer-expander. Principal among such faults is a tendency for the spacer-expander to overlap at the ends rather than become properly abutted during installation on the piston. If this condition is not observed and corrected prior to the time an attempt is made to load the piston into the cylinder bore, severe damage will occur to the ring, piston and bore when such attempt is made, and subsequently, if the condition remains unobserved and uncorrected. The problem of overlapability is inherent in the concept of circumferentially compressible spacer-expanders and is present to a more or less degree in all such oil ring designs. The problem derives simply from the very same circumferential compressibility that forms the basis of operation of the spacer-expander. The amount of compressibility ordinarily required for the proper function of such a spacer-expander is on the order of one quarter to one-half of an inch, which is to say that the uncompressed circumferential length must be about one quarter to one-half of an inch greater than the circumferential length when properly abutted and compressed for installation into the cylinder bore. Thus it is possible to overlap the ends of such a spacer-expander by about one quarter to one-half of an inch when it is placed in the oil ring groove.

One of the principal objectives in oil ring design is flexibility, or the ability to conform easily and rapidly to any irregularities that may occur in the cylinder bore surface. It is well known that various forms of distortion or deviations from true axial straightness and true roundness are frequently present in internal combustion engine cylinder bores, caused either by inaccuracies in the manufacturing process or by non-uniform stresses applied by head bolts or other attachments to the engine cylinder block. A continuing trend toward the use of lighter materials and thinner material sections for the desirable purpose of weight reduction has the effect of increasing the probability that some form of distortion will be present in an engine cylinder bore. To perform its function satisfactorily, an oil ring must be sufficiently flexible to follow any irregularities in the engine cylinder bore, preferably maintaining a uniform radial pressure distribution around the periphery of the rails and a uniform division of radial pressure between the two rails.

The rails should thus be free to move independently and without interaction between each other. Present spacer-expander designs are far from ideal with respect to their flexibility, especially regarding the division of radial pressure between the two rails and the freedom thereof to act independently. Greater flexibility in a spacer-expander and rail type oil ring can be achieved in three principal ways. The flexibility of the spacer-expander can be increased by the use of less material of a higher strength, the flexibility of the rails can be increased by a reduction in their section, especially by a decrease in the radial thickness, or the inherent flexibility of the entire assembly can be improved through some basic improvement in the concept of design.

In a circumferentially compressible spacer-expander it is generally not feasible to increase flexibility through the use of thinner material due to the resulting increase in the overlap problem discussed above. Neither is it practical to secure a useful increase in flexibility through the use of rails of decreased radial thickness, due to the resultant increased likelihood of the occurrence of another loading problem widely known in the industry as "pop-out" or "necklacing."

The pop-out problem results from the excessive clearance between the inner periphery of the spacer-expander and the groove root prior to the compression of the assembly for loading. If the inner periphery of the spacer-expander is brought into contact with the groove root on one side of the piston the rails may be pushed completely out of the groove on the opposite side of the piston, resulting in the possibility of one of the rails becoming wedged between the outer periphery of the piston and the cylinder bore during assembly, thus causing damage to the piston, ring and bore. With conventional circumferentially compressible spacer-expanders, the necessary condition for the prevention of pop-out is that the radial thickness of the rails must be somewhat greater than the sum of the diametrical deflection of the assembly which occurs during compression for loading, plus the maximum normal clearance between the inner periphery of the spacer-expander and the groove root, plus the radial distance of any chamfer that may be present on the corners of the groove. Thus a lower limit is established on the permissible rail radial thickness and consequently on the rail flexibility. This limitation, like the overlap problem, is inherent in the concept of a circumferentially compressible spacer-expander since it results from the excessive clearance between the spacer-expander and the groove root prior to compression of the ring for loading, and the excessive clearance is due to the circumferential compressibility that forms the basis for the operation of the device.

Another design objective for oil rings is minimum weight. High peak accelerations occurring in internal combustion engines operating at high speeds result in very large inertia forces on such components as pistons and rings, and these can only be reduced through a reduction in weight. It has been shown above, however, that such weight reduction cannot be practically achieved in oil rings using circumferentially compressible spacer-expanders due to the related problems of overlap and pop-out, which are both compounded by a reduction in material sections.

Accordingly, one object of the present invention is to provide an expander for a rail-type oil ring which eliminates the faults found in circumferentially compressible expanders while retaining all of their advantages, and at the same time offers considerable improvement in manufacturing economy.

More particularly, an object of this invention is to provide an expander, preferably in the form of a combined spacer and expander, which eliminates the circumferential compressibility characteristic which causes many of the problems associated with present oil ring designs. Spacer-expanders made according to the present invention are compressible in radial direction only and are substantially incompressible in the circumferential direction. For this reason the radial clearance between the groove root and the inner periphery of the spacer-expander will not change as the assembly is compressed for loading into the cylinder bore. Thus, the length of the spacer-expander need only be sufficient to prevent the inner periphery thereof from coming into contact with the groove root under any normal conditions of service, and the radial clearance between the spacer-expander and the groove root will be the same before it is compressed as after. Thus the present invention provides a spacer-expander whose circumferential length is such as to positively prohibit the possibility of over-lapping the ends while still maintaining proper groove clearance. The pop-out problem is likewise eliminated by doing away with the excessive pre-compressed groove root clearance of circumferentially compressible spacer-expanders.

Since the present invention eliminates the twin problems of overlap and pop-out, it also removes the restrictions on designing for increased flexibility and lighter weight. Moreover, the spacer-expander of the present invention applies radial force to the rails substantially independently and with virtually no interaction between them. This feature, along with the use of thinner material in the spacer-expander and a substantial reduction in rail radial thickness and axial width, results in an oil ring with greatly increased flexibility as compared to prior art designs.

Another problem encountered in the design of circumferentially compressible spacer-expanders is the change in design necessitated by a change in diameter. An examination of some of the design parameters for such spacer-expanders will make this fact apparent. The fundamental design parameter for oil rings is radial wall pressure. Oil rings are generally designed to give a certain radial wall pressure, the value of which has been established through long experience. In general it is not possible to reduce this value very much without impairing the function of the oil ring, and it is not desirable to increase it very much, since this would increase the cost of the oil ring and might result in excessive wear or scuffing. It can be assumed, therefore, that the radial wall pressure is a fixed constant for different diameters of oil rings. Another basic parameter is deflection, which in a circumferentially compressible spacer-expander is a change in circumferential length that takes place when the ring is compressed. This parameter is also established within rather narrow limits, the lower limit being established by the permissible decrease in radial wall pressure during the life of the ring due to wear on the outer periphery of the rails. It is undesirable to fix the upper limit of deflection appreciably greater than this lower limit for two reasons. Any increase in circumferential deflection tends to increase the overlap and pop-out problems. Also, all other factors being equal, an increase in deflection results in a decrease in the efficiency of the spacer-expander and a consequent increase in the amount of material required. Thus the deflection can also be considered to be a fixed constant for different diameters.

If the radial wall pressure and deflection are fixed, a change in diameter requires a change in one or more of the other design parameters in a circumferentially compressible spacer-expander. If the circumferential length of such a spacer-expander is increased to accommodate a larger bore size without an increase in deflection, the result is a decrease in the circumferential force developed and an even more pronounced decrease in the radial wall pressure. Thus it becomes necessary when changing sizes to make some other change in the design, such as changing the material thickness or the width or length of the spring members in order to maintain the desired value of radial wall pressure. It therefore becomes necessary to stock a variety of punching and forming dies in order to accommodate a variety of oil ring sizes. This problem again is inherent in the concept of circumferentially compressible spacer-expanders.

Accordingly, another object of the present invention is to provide an expander which eliminates the problem of adapting a spacer-expander design to different diameters. The only change that is required to accommodate a spacer-expander of the present invention to a different bore size is simply a change in the diameter proportionate to the change in bore diameter. Since a spacer-expander made according to the invention is compressed in the radial direction only, an increase in diameter to accommodate a larger oil ring size results in no change in either deflection or radial wall pressure. Thus, one basic design, one material thickness and one set of punching and forming dies can be used to make a wide variety of diameters, resulting in considerable savings in die and material inventories and design and set-up expense.

Other objects, features and advantages of the present invention will become apparent from the following detailed description taken in conjunction with the accompanying drawings wherein.

Figure 1:
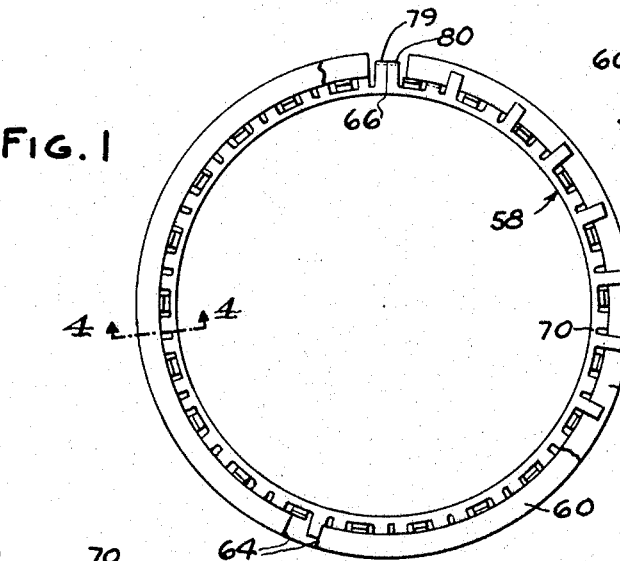
FIG. 1 is a plan view of an oil ring assembly incorporating one embodiment of a spacer-expander of the present invention and having portions broken away to illustrate details thereof.
Figure 4:
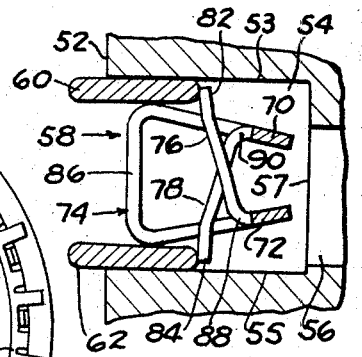
Figure 2:
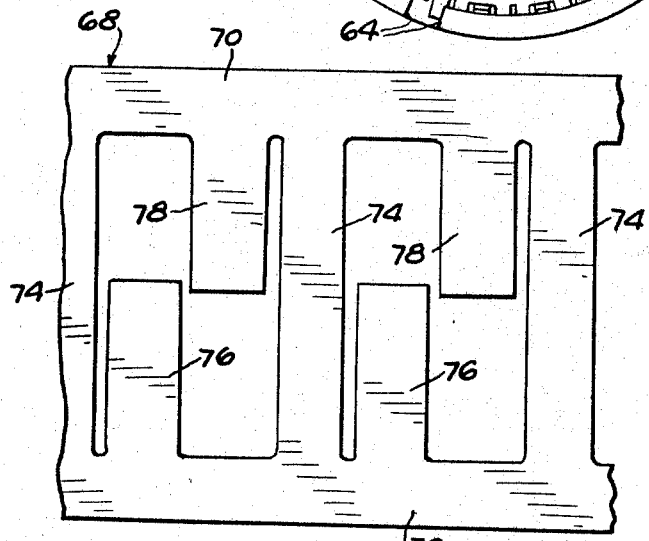
FIG. 2 is a greatly enlarged fragmentary plan view of the flat metal ribbon stock from which the spacer-extender of FIGS. 1, 3, 4 and 5 is formed, illustrating the same after the die punching operation but prior to the bending operation.
Figure 5:
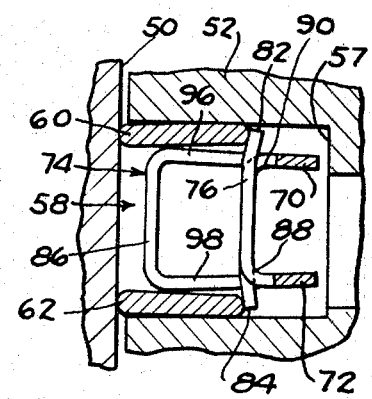
Figure 3:
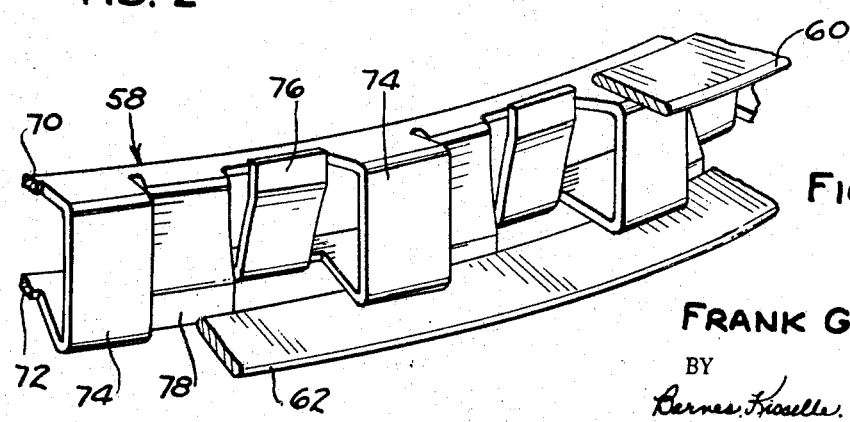
FIG. 3 is a fragmentary perspective view of the spacer-expander of FIGS. 1–5 after the bending operation has been completed.

FIGS. 4 and 5 are enlarged sectional views taken on the line 4—4 of FIG. 1 with the oil ring assembly installed in the oil ring groove of a piston, FIG. 4 illustrating the oil ring assembly at its free diameter prior to installation of the piston in the engine cylinder and FIG. 5 illustrating the oil ring assembly compressed to operating diameter with the piston installed within the engine cylinder.

FIGS. 6–10 inclusive illustrate a second embodiment of the spacer-expander of the invention and correspond to FIGS. 1–5 respectively, FIGS. 9 and 10 being taken on the line 9—9 of FIG. 6.

FIG. 11 is a plan view of an oil ring assembly incorporating a third embodiment of a spacer-expander of the present invention and having portions broken away to illustrate details thereof.

FIG. 12 is a greatly enlarged fragmentary plan view of the flat metal ribbon stock from which the spacer-expander of FIGS. 11–18 is formed, illustrating the same after the die punching operation but prior to the bending operation.

FIG. 13 is an enlarged fragmentary perspective view of the spacer-expander of FIGS. 11–18 after the bending operation has been completed.

FIG. 14 is an enlarged fragmentary plan view of the spacer-expander of FIGS. 11–18 illustrating the ends of the same in abutment.

FIGS. 15 and 16 are further enlarged fragmentary end and perspective views respectively of the end abutment structure of the spacer-expander of FIGS. 11–18.

FIGS. 17 and 18 are enlarged sectional views taken on the line 17—17 of FIG. 11 with the oil ring assembly installed in the oil ring groove of a piston, FIG. 17 illustrating the oil ring assembly at its free diameter prior to installation of the piston in the engine cylinder and FIG. 18 illustrating the oil ring assembly compressed to operating diameter with the piston installed within the engine cylinder.

Figure 19:
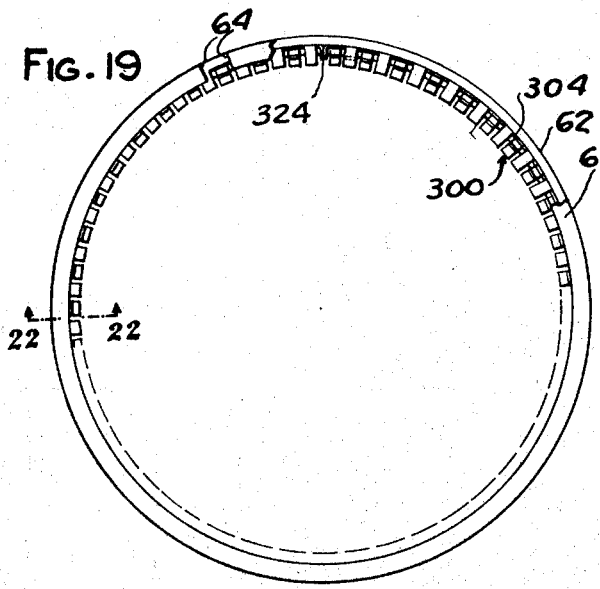
Figure 22:
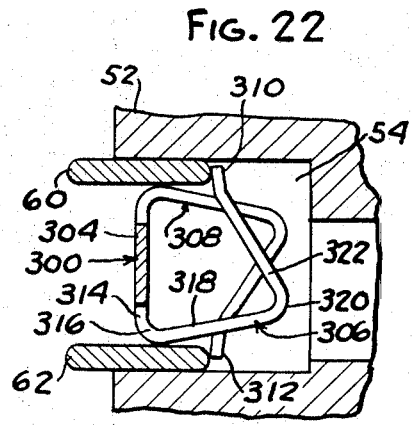

FIGS. 19–23 inclusive illustrate a fourth embodiment of the spacer-expander of the invention and correspond to FIGS. 1–5 respectively, FIG. 22 being taken on the line 22—22 of FIG. 19.

Figure 24:
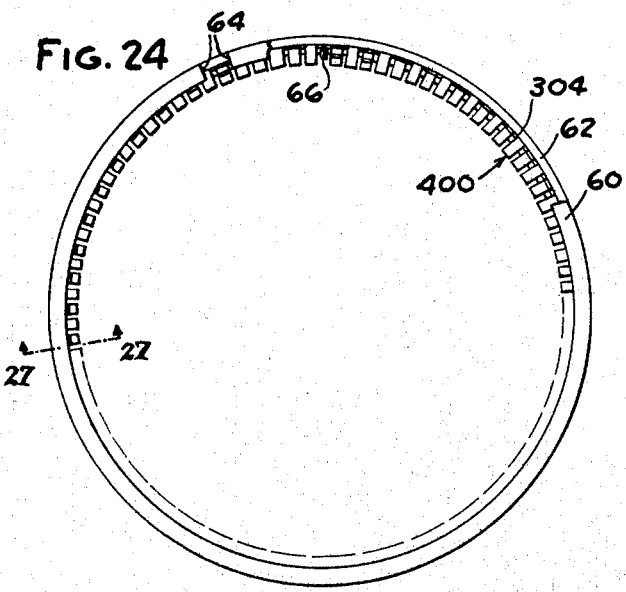
Figure 25:
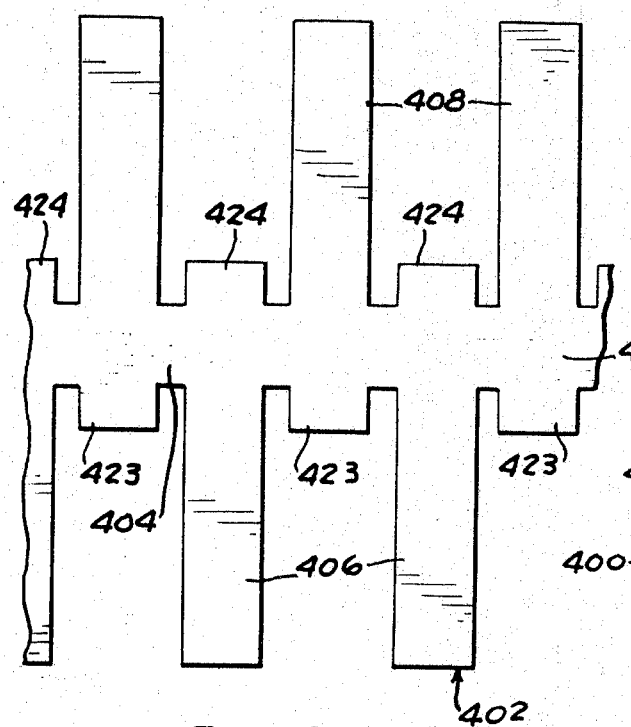
Figure 27:
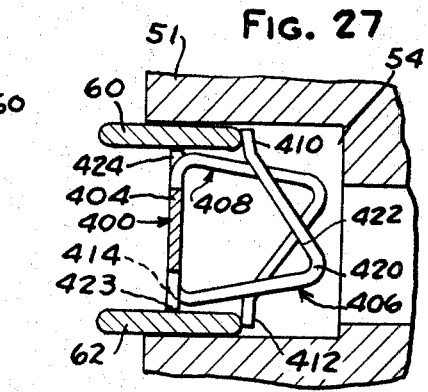
Figure 28:
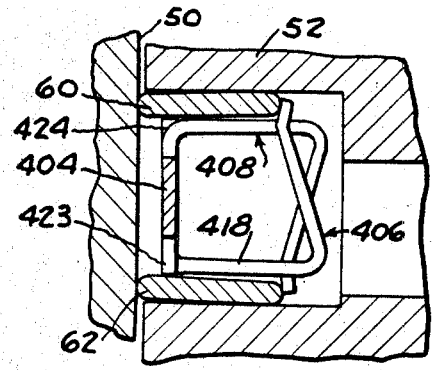
Figure 26:
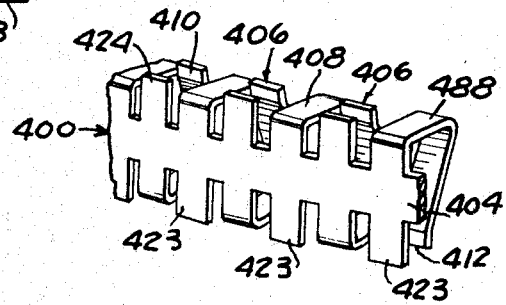

FIGS. 24–28 inclusive illustrate a fifth embodiment of the spacer-expander of the invention and also correspond to FIGS. 1–5 respectively, FIGS. 27 and 28 being taken on line 27—27 of FIG. 24.

As illustrated by the five embodiments of the present invention shown herein, the expander of the invention preferably comprises an annular, parted one-piece combined spacer and expander preferably formed from sheet steel and adapted to be positioned in engagement with one or more thin metallic rails disposed in the oil ring groove of a piston in an internal combustion engine. The expander is of the self-supporting or non-bottoming type, i.e., it does not have support contact with the innermost or root wall of the piston ring groove, and is operable as a spacer to maintain such rail or rails in side-sealing contact with the adjacent groove surface or surfaces and as an expander to apply a uniform radial pressure to the rail or rails, thus forming with such rail or rails an effective multi-piece oil control ring assembly. In accordance with the principal feature of the present invention, said expander includes a circular integral band of material which, when the ends of the expander are abutted in the operative condition of the ring assembly, causes the expander to be substantially incompressible circumferentially. The expander also has integral rail engaging portions in the form of spring legs which are spaced circumferentially along the band and which are resilient radially of the spacer-expander to produce a radial force which is applied to the inner periphery of the rail or rails. In the case of a dual rail ring assembly of the present invention, this force is applied independently to the respective rails by separate sets of spring legs to minimize interaction between the rails. The ends of the expander are abutted upon installation in the groove and when so abutted there is a radial clearance between the inner periphery of the ring assembly and the root surface of the piston groove which does not vary during operation and hence which may be minimized to alleviate the pop-out and overlapping problems.

In the accompanying drawings reference numeral 50 designates the wall of a cylinder in an internal combustion engine receiving a conventional piston 52 having a piston ring groove 54 therein and an oil drainage opening 56, as is well known in the art.

Referring in more detail to FIGS. 1–5 inclusive which illustrate one embodiment of the invention, an expander-spacer 58 is shown in operative engagement with a pair of piston ring elements 60 and 62, commonly designated upper and lower rails respectively, each of which is formed of ribbon steel coiled edgewise and has substantially flat sides and a relatively narrow cylinder scraping edge at its outer periphery, as is well understood in the art. Preferably rails 60 and 62 are both parted as at 64, and preferably expander 58 is likewise parted at 66, to permit each of these elements of the piston ring assembly to be radially expanded to piston O.D., slipped endwise over the piston and then allowed to snap into groove 54 in the usual manner. However, it is to be understood that this and the subsequently herein described oil ring embodiments may employ a parted rail or rails in combination with a completely continuous or solid ring spacer-expander of the invention when adapted for use in the less common multi-piece type piston which when disassembled permits endwise access to the ring groove at root diameter.

Expander 58 is preferably made in a progressive die blanking and bending operation from relatively thin sheet metal stock such as spring steel or other suitable material. The die blanking operation produces a flat metal strip 68 having the configuration shown in FIG. 2. Blank 68 has a pair of parallel bands 70 and 72 running continuously along each longitudinal edge thereof which are interconnected by a plurality of longitudinally spaced and transversely extending struts 74 which are integrally connected at their opposite ends to the respective bands 70 and 72.

A pair of spring legs 76 and 78 are formed in the space between each adjacent pair of struts 74, legs 76 and 78 being integrally joined at their outer ends to bands 70 and 72 respectively and being longitudinally staggered or offset relative to one another so that their free ends or feet clear one another and slightly overlap transversely of the strip.

Blank 68 is further processed in a bending and coiling operation and then is cut into the desired circumferential lengths to form the annular, parted one piece spacer-expander 58 (FIGS. 1, 3–5). Expander 58 in finished form is generally C-shaped in radial cross section with bands 70 and 72 disposed at the inner periphery thereof and axially spaced apart by the now C-shaped struts 74 (as viewed in FIG. 5). The terminal ends 79 and 80 (FIG. 1) of the expander may comprise a pair of the struts 74 adapted to abut one another in the operative radially compressed condition of the ring.

In the uncompressed or free state of spacer-expander 58 prior to assembly with rails 60 and 62 and prior to installation in groove 54, ends 79 and 80 preferably will circumferentially overlap one another if offset from one another axially of the spacer-expander. Hence a light radial expansion force must be applied to spacer-expander 58 in order to bring ends 79 and 80 into alignment and abutment with one another. In this condition and also after assembly of the spacer-expander with rails 60 and 62 bands 70 and 72 are tilted inwardly toward one another as illustrated in FIG. 4. Also, in the abutted free condition of the ring assembly legs 76 and 78 are bent at 88 and 90 near their junction with the respective bands 70 and 72 and then extend predominantly axially but also radially outwardly so that their respective free ends or feet 82 and 84 project axially beyond the side of the expander remote from the particular band to which the associated leg is connected. In other words, legs 76 and 78 cross over one another as viewed in radial cross section (FIGS. 4 and 5) and are inclined radially outwardly in the free condition of the expander. When rails 60 and 62 are assembled around and on expander 58 and the ring assembly is positioned in groove 54, the inner peripheries of rails 60 and 62 are engaged by feet 82 and 84 of legs 76 and 78 respectively. The rails are axially spaced apart adjacent the top and bottom walls 53 and 55 of groove 54 by the circumferentially spaced plurality of vertical legs 86 of struts 74. When rails 60, 62 are assembled on spacer-expander 58 and radially compressed for insertion of piston 52 into the cylinder bore (FIG. 5), the rails press fingers 76 and 78 radially inwardly, thereby bending fingers 76 and 78 to their position shown in FIG. 5 wherein the major portion of the fingers extends axially so that the fingers appear L-shaped in radial cross section.

In flexing to the stressed position (FIG. 5), fingers 76 and 78 bend in the manner of cantilever beams, the radial force produced between the rails 60 and 62 and the feet 82 and 84 producing a bending moment which has a maximum value at the corners 88 and 90 and which is imparted through the bands 70 and 72 to the struts 74.

This same bending moment is propagated throughout the struts 74, causing them to bend in such a manner as to cause bands 70 and 72 to spread axially apart to the position illustrated in FIG. 5 and to contribute substantially to the radially inward deflection of feet 82 and 84. Thus, approximately one-third of the radial deflection of the feet 82 and 84 results from bending of the fingers 76 and 78, and the balance results from bending of the struts 74. Once compressed with ends 79, 80 abutting, spacer-expander 58 is operable to exert via the stressed legs 76 and 78 the desired radial expansion pressure on rails 60 and 62, and legs 76 and 78 and struts 74 individually flex as necessary to accommodate radial expansion of the rails as they wear as well as radial expansion and contraction of the rails due to variations in the cylinder bore encountered during piston reciprocation.

The oil scraped form the cylinder wall 50 by rails 60 and 62 flows inwardly between the rails through the various openings in expander-spacer 58, particularly in the circumferential spaces between struts 74 just above lower rail 62. Since bands 70 and 72 are disposed radially inwardly from the inner peripheries of the rails, there is ample oil ventilating space between bend 88 of leg 76 and the inner periphery of rail 62. The circumferential clearance between legs 76 and 78 and struts 74 also provides oil ventilation spaces, as of course do the spaces resulting from the radially staggered relation of the legs and struts.

Feet 82 and 84 of legs 76 and 78 are preferably bent at a slight angle to the axial portion of the legs such that upon deflection to the FIG. 5 position, feet 82 and 84 bear against the inner peripheries of rails 60 and 62 at a slight inward angle to the vertical to thereby develop an axial component of force tending to spread apart or dish rails 60 and 62 into side sealing contact with the respectively adjacent side walls 53 and 55 of groove 54. The predominant force, however, is radially outwardly to force the rails into oil scraping and sealing contact with the wall 50 of the cylinder.

The circumferential length of spacer-expander 58 is predetermined relative to the size of piston groove 54 such that the inner periphery of spacer-expander 58 will not be forced into contact with the groove root surface or bottom wall 57 during operation and yet not sufficiently great as to permit the ends to become overlapped after installation in the groove. Furthermore, it can be seen that the clearance between the inner periphery of the spacer-expander and the groove root 57 does not change when the assembly is compressed for installation into a cylinder bore, and that the excessive clearance existing in conventional circumferentially compressible spacer-expanders prior to their being compressed for loading is not present. Thus a substantial reduction in the rail radial thickness and in the flexibility thereof can be achieved while the likelihood of pop-out is decreased. It can also be seen that the pressure applied to the two rails by the feet 82 and 84 is applied to them substantially independently and uniformly around their inner periphery. Thus the rails are biased outwardly independently of each other and are free to individually follow any irregularities in the engine cylinder bore with great accuracy. The spacer-expander can be made of much thinner material than is ordinarily used in conventional spacer-expanders, and this fact makes a further contribution to its great flexibility.

A second embodiment of the invention is illustrated in FIGS. 6–10 inclusive wherein a spacer-expander 100 is shown which is in many respects similar to spacer-expander 58 and is produced in the same manner. Thus expander-spacer 100 is bent and coiled from a die blanked strip 168 which as shown in FIG. 7 has continuous longitudinal marginal bands 170 and 172 interconnected by struts 174, with a pair of spring legs 176 and 178 extending transversely between each adjacent pair of struts 174. Legs 176 and 178 are longitudinally staggered and extend almost to the opposite band and thus transversely overlap one another almost their full length. The finished expander 100 after the bending and coiling operations is shown fragmentarily in FIG. 8 wherein it will be seen that expander 100 has a generally C-shaped configuration in radial cross section, as is true of struts 174. As best seen in FIGS. 9 and 10, spring legs 176 and 178 are also generally C-shaped in radial cross section and extend radially outwardly from their connection with the associated band 170, 172 respective to curved portions 188 and 190 thereof where each leg is bent to extend in an axial direction adjacent the axial leg of strut 174. Legs 176 and 178 are then respectively return bent at 189 and 191 to extend radially inwardly adjacent the associated rails 60 and 62, finally terminating at their free ends or feet 182 and 184 respectively. Feet 182, 184 are preferably inclined to exert on rails 60 and 62 respectively an axial side-sealing component of force in addition to the major radial outwardly biasing component.

In assembly and operation, spacer-expander 100 closely resembles spacer-expander 58 of the previous embodiment although its deflection characteristics will differ due to the additional metal present in spacer-expander 100 and the slightly different configuration of the legs 176 and 178. As in the case of spacer-expander 58, a considerable portion of the radial deflection of the feet 182 and 184 is contributed by bending of the struts 174. The principal difference between spacer-expander 58 and spacer-expander 100 is that the latter has longer legs 176 and 178, which contribute more to the radially inward deflection of the feet 182 and 184 than the corresponding legs 76 and 78 contribute to feet 82 and 84 on spacer-expander 58. This results in a more efficient utilization of material and a lower stress level. Adequate oil ventilating spaces are provided by the circumferential clearances between the legs and struts as well as by the inward inclination of the legs in the stressed position thereof.

FIGS. 11–18 illustrate a spacer-expander 200 of the invention which is similar in structure and operation to spacer-expanders 58 and 100, differing therefrom primarily in the shape of the spring legs 276 and 278 and the provision of the preferred end abutment structure illustrated in FIGS. 12–16. Legs 276 and 278 each have a straight portion 287 extending radially outwardly from the associated bands 270 and 272, a curved portion 288 disposed at the outer periphery of the spacer-expander, and another straight portion 289 extending radially inwardly at about a 30° angle to the axis of spacer-expander 200 in the uncompressed condition thereof (FIG. 17). Portion 289 terminates at the foot 282 which is angled so that it is slightly inclined from the vertical in the compressed condition of the ring assembly (FIG. 18) to develop side sealing force as well as outward force on the rails.

A feature common to spacer-expander 200 and previous spacer-expanders 58 and 100 is the flexing action of the C-shaped struts 274 which open up as the legs 76 and 78, 176 and 178, or 276 and 278 are moved radially inwardly by the rails.

Spacer-expander 200 is formed from a die punched blank 268 (FIG. 12) which is provided at each end with a preferred form of end abutment structure comprising a T-shaped pad 275 having a stem portion 277 integrally joined to a side edge 279 of a slightly narrower end strut 274' of blank 268. In the folding or bending operation, bands 270, 272 are folded back into the configuration of FIG. 17 and then pads 275 are folded or bent adjacent strut 274' so as to extend radially inwardly of the expander-spacer as seen in FIGS. 14, 15 and 16. The cross bar 281 of pad 275 extends axially and overlaps the adjacent sheared ends of bands 270 and 272. Pads 275 thus are adapted to abut one another in face-to-face contact in the abutted condition of the spacer-expander to provide a reliable jam free joint at the parting of the spacer-expander. It is to be understood that pads 275 may be employed on any of the embodiments disclosed herein.

Figure 23:
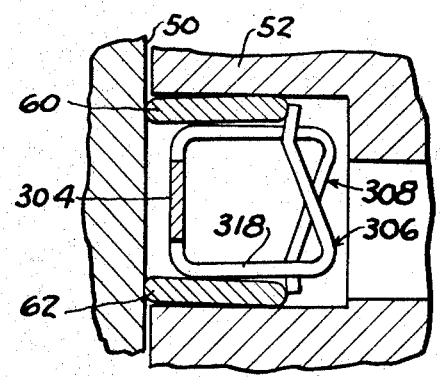
Figure 20:
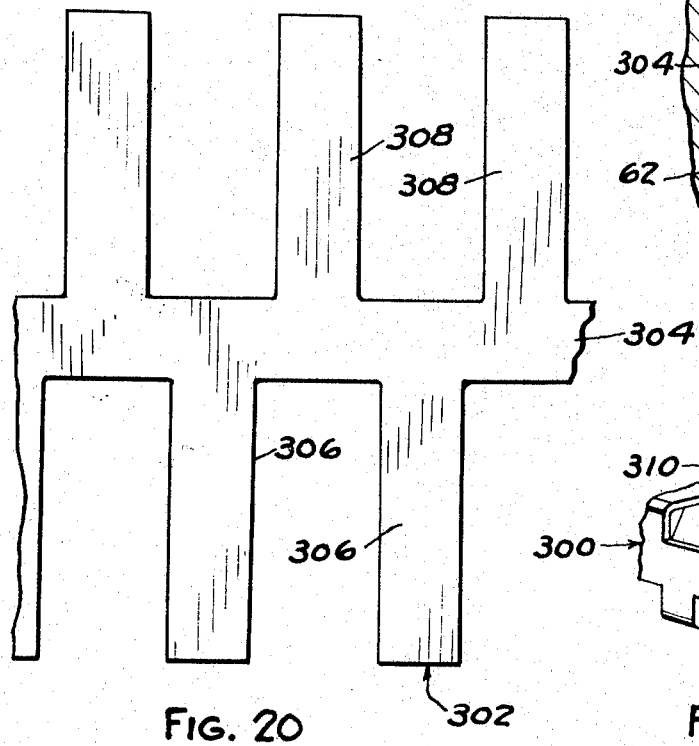
Figure 21:
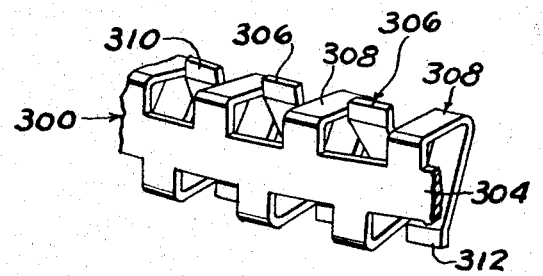

FIGS. 19–23 inclusive illustrate a spacer-expander 300 of the present invention which is die punched from sheet metal stock to form a blank 302 as shown in FIG. 20 which is subsequently bent to the final shape illustrated in FIGS. 21, 22 and 23. Blank 302 consists of a straight longitudinally extending center band 304 with a series of circumferentially spaced spring legs 306 and 308 integrally joined to opposite longitudinal edges of the band and extending oppositely therefrom, legs 308 and 306 being staggered relative to one another longitudinally of the strip. Band 304 is circumferentially continuous and incompressible and is disposed at the outer periphery of spacer-expander 300, spring legs 306 and 308 being bent therefrom and disposed radially inwardly thereof. After the bending operation, the alternately spaced legs 306 and 308 are bent as in FIG. 22 into a form such that they constitute a very flexible portion of spacer-expander 300, their feet 310 and 312 being disposed to bear against the inner periphery of the rails 60, 62 respectively.

Since legs 306 and 308 are identical in shape, only leg 306 will be analyzed. Referring to FIG. 22, leg 306 has a short axial portion 314 joined to the lower edge of band 304 and terminating in a curved portion 316 from which a radial portion 318 extends inwardly to another curved portion 320 disposed at the inner periphery of the spacer-expander. Radial portion 318 is inclined toward the opposite side of the spacer-expander in the uncompressed condition thereof (FIG. 22). Leg 306 has an outwardly inclined portion 322 extending from curved portion 320 up to foot 310 which in turn is angled slightly inwardly therefrom.

Legs 306 and 308 form efficient spring members to develop the required radial force against rails 60, 62 when compressed thereby, and in addition portions 318 of legs 306 and 308 together form spacing structure for properly positioning the rails axially in groove 54 as the leg portions 318 are spread apart to their positions shown in FIG. 23. Feet 310 and 312 are bent at such an angle as to bear upon rails 60, 62 in a partially axial direction in order to assure contact between the rails and the top and bottom surfaces of the ring groove 54, thus providing effective side sealing between the rails and groove at all times. The angles at which leg portions 314, 318 and 322 are bent are designed so as to assure that the motion of feet 310 and 312 is substantially radial as the spacer-expander is compressed and as the rails move radially. As can be seen by comparing FIGS. 22 and 23, the deflection of the radially oriented portions 318 of the legs when the spacer-expander is compressed is largely axial, and that due to the curved portion 320 of the legs, this deflection results from a radial deflection of feet 310 and 312. A substantially uniform bending moment is thus applied to radial portion 318 of the legs, resulting in a uniform distribution of stress to thereby provide a highly efficient spring member. Consequently a minimum of material is required to develop the requisite spring force.

As in the previous embodiment, spacer-expander 300 is abutted at the gap 324 thereof (FIG. 19) and has a predetermined circumferential length which prevents the inner periphery of the spacer-expander from being forced against the groove root 57 during operation and which prevents the ends from being overlapped upon installation. The end abutment structure may consist of a bent leg 308 abutting a leg 306 at the respective end, or abutment structure similar to that shown in FIGS. 15 and 16 may be provided.

FIGS. 24–28 inclusive illustrate a spacer-expander 400 also in accordance with the present invention which is formed from a flat blank 402 (FIG. 25) having a longitudinally extending central band 404 with flat spring legs 406 and 408 joined to the opposite longitudinal edges thereof and extending oppositely therefrom in longitudinally staggered relation relative to one another. Spacer-expander 400 is identical to spacer-expander 300 with the addition of ears 423 and 424 projecting axially from the center band which serve to axially space the outer portions of rails 60 and 62; and owing to their being stamped rather than formed, permit a closer tolerance on the axial dimension of the outer rail supports.

From the foregoing description it will now be understood that the various spacer-expander embodiments of the invention when combined as described with at least one rail provide an improved oil ring assembly from both operational and manufacturing standpoints in terms of better oil control, economy of manufacture, ease of handling and elimination of pop-out problems in subsequent assembly first in the piston and then with the piston in the engine. Further improved results are obtained from an oil ring of the invention when the various circumferentially non-compressible spacer-expander embodiments are combined with at least two rails maintained in axially spaced relation in the piston oil ring groove by the spacer-expander as described previously. Such a multiple or dual rail oil ring of the invention provides even better control than previous dual rail rings of the type using circumferentially compressible spacer-expanders due to the independent biasing of the top and bottom rails by their associated sets of spring legs which act independently of one another and in turn receive support from the substantially constant diameter circumferentially non-compressible band of the spacer-expander. Thus, for example, should rail 62 be pushed radially inwardly by a variation in cylinder contour on the intake stroke of piston 52, the resulting radially inward deflection of its associated spring legs will not materially affect the action of the legs acting on rail 60. Hence 60, being axially spaced from rail 62, will remain in oil sealing engagement with the cylinder wall in a radially outwardly offset position relative to rail 62 until it too strikes and is radially contracted by the contour variation, at which time rail 62 may have passed the variation and been independently expanded by its associated set of spring legs so that it is now radially outwardly offset relative to rail 60. Thus, unlike oil rings employing circumferentially compressible spacer-expanders, the lower rail 62 will lose little or none of its biasing support under such conditions, thereby achieving better oil control, particularly under high vacuum conditions on the intake stroke. It will also be apparent from the foregoing description and from FIGS. 1–28 of the drawings that the several embodiments of a single or dual ring or rail oil ring assembly of the present invention, whether incorporating spacer-expander 58, 100, 200, 300 or 400, share several novel features which contribute to the previously stated objects of the present invention. For example, each of these embodiments includes a spring leg which extends lengthwise from its free end generally axially (in the same direction as the axis of the ring assembly) for at least a major portion of the axial distance between the groove side walls 53 and 55. Also, in each embodiment each of the spring legs also extends generally radially (in the same direction as the radius of said ring assembly) for at least a major portion of the radial distance between the mouth of the groove (the zone of the groove flush with the outer periphery of piston 52) and the root diameter of the groove as defined by the groove root, back wall or bottom wall 57, as these terms are used synonymously in the art.

In addition, each of the spacer-expanders 58, 100, 200, 300 and 400 includes ring spacing structure in the form of supports disposed at the outer periphery of the spacer-expander. These supports in the case of spacer-expanders 58, 100 and 200 comprise the axially extending portions 86 and contiguous curved ends of struts 74, 174 and 274. In a spacer-expander 300 these supports comprise axial portion 314 and the contiguous curved portion 316 of spring legs 306 and 308 as well as the axially interposed portions of band 304, and in spacer-expander 400 the projections or struts 423 and 424 and the axially interposed portions of band 404. Moreover, in each of the spacer-explanders 58, 100, 200, 300 and 400 each of the spring legs extends lengthwise from a longitudinal edge of the band to which it is connected generally perpendicularly to the longitudinal dimension of the band (an imaginary circular line extending medially through the band concentric with the axis of the ring assembly). Thus the longitudinal or lengthwise dimension of each leg, from its connection to the band to its free end, is co-planar with the axis of the band, i.e., each leg extends lengthwise in the imaginary plane defined by the axis of the ring assembly and a radius of the ring assembly taken through the leg. This characteristic permits a maximum utilization of the limited space available in the groove and the limited material available in the spacer-expander to develop rail biasing spring forces. It also permits a maximum number of spring legs to be formed circumferentially around the spacer-expander to better localize application of biasing forces on the rail which in cooperation with the preferred "radially thin" rails results in high conformability of the rail or rails to out-of-round or other irregularities in the cylinder bore.

Another feature common to spacer-expanders 58, 100, 200, 300 and 400 is the disposition of the aforementioned ring or rail spacing supports at the outer periphery of the spacer-expander. This facilitates insertion of the piston ring or rail in the space axially between the spacer-expander and the adjacent side wall 53 or 55 of the groove because the supports form a barrier at the outer periphery of the spacer-expander which guides the rail into its proper space. It is also to be noted that in a dual rail ring assembly with the supports so arranged at the outer periphery of the spacer-expander, the forces exerted by the rails 60 and 62 on the free ends of the associated legs produce oppositely acting force couples which react against one another in the supports at the outer periphery of the spacer-expander. Thus a maximum amount of the material of the spacer-expander is active in producing ring biasing spring forces due to the deflection of the legs and their connections to the aforementioned supports, as well as to the deflection of the supports themselves. In spacer-expanders 58, 100 and 200, a further deflection occurs as the bands 70 and 72, 170 and 172, or 270 and 272, deflect from their dished condition in which they repose in the uncompressed free state condition of the expander-spacer (as shown in FIGS. 4, 9 and 17) to a less dished or flatter condition as they are spread axially apart in response to the spring legs being deflected by the rails to their operative rail biasing position (as shown in FIGS. 5, 10 and 18 respectively). The bands in thus deflecting from a dished toward a flat condition act in the manner of Belleville spring washers and thus further contribute to the rail biasing spring forces generated in the spacer-expanders.

I claim:

1. A non-bottoming piston ring assembly adapted for use in a ring groove of a piston wherein the groove is axially defined by first and second axially spaced side walls, comprising in combination at least one split ring and a one-piece split annular spacer-expander for said ring, said spacer-expander comprising at least one annular substantially circumferentially incompressible band generally concentric with said ring and extending substantially 360 degrees when assembed with the ends of the spacer-expander abutted in the operative condition of said spacer-expander, a plurality of supports connected to and circumferentially spaced along and extending axially from said band for locating said ring adjacent the first side wall of the ring groove, said supports also supporting said band in the groove in spaced relation with at least one of said side walls of the groove, said supports extending axially between said ring and the second side wall of the groove adjacent the outer periphery of said spacer-expander, a plurality of spring legs circumferentially spaced along and attached directly to said band, each of said legs having a greater axial extent than circumferential extent and a free end engaging said ring radially inwardly of said supports to bias said ring radially outwardly and a connection between the other end of each leg and said band, said connection being spaced axially from said ring and located between the ring and the second side wall of said groove, each of said legs having a portion which extends generally radially relative to said ring and a portion which extends generally axially through a major portion of the distance between the side walls of the groove, said legs, said band, and said supports being made of spring material and are each deflected in response to contraction of said ring to operating diameter to thereby cooperate to develop the radially outward biasing forces exerted by said free ends of the legs on said ring, said legs and said supports developing the major portion of the radially outward biasing forces exerted by said free ends of said legs on said ring.

2. The ring assembly as set forth in claim 1 wherein each of said legs also extends generally radially relative to said ring for at least a major portion of the radial distance between the mouth of the groove and the root diameter of the groove.

3. The ring assembly set forth in claim 1 wherein said ring assembly includes a second ring positioned by said supports axially spaced from said first-mentioned ring for locating said second ring adjacent the second side wall of the groove and including a second set of spring legs each having a free end engaging said second ring to bias said second ring radially outwardly and a connection directly attaching the other end of each leg of said second set of legs and said band, said connections for said second set of legs being spaced axially from said second ring and said respective connections of said first and second sets of legs both being disposed between said rings, whereby the forces exerted by said first and second rings respectively on said first and second sets of legs produce bending moments reacting against one another in said band at the outer periphery of said spacer-expander whereby a maximum amount of the material of said spacer-expander is active in producing ring biasing spring forces.

4. A piston ring assembly adapted for use in the piston ring groove of a piston adapted to reciprocate in a cylinder, said piston ring assembly comprising at least one split annular ring, a split annular spacer-expander for locating and radially biasing said ring in the piston ring groove comprising two annular substantially circumferentially non-compressible bands when assembled with the ends of the spacer-expander abutted, said bands having inner diameters larger than the diameter of the bottom of the ring groove whereby said piston ring assembly is spaced from the bottom of the grove when assembled therein, a plurality of spaced spring strut members attached to and extending radially outwardly of said bands, each of said spring strut members having one end attached to one of said bands and another end to the other of said bands, said spring strut members axially spacing said bands with one of said bands adjacent said ring and the other of said bands remote from said ring, a plurality of circumferentially spaced spring legs attached directly to said remote band and each extending axially and terminating in a free end disposed axially beyond said adjacent band and contacting the inner periphery of said ring, said spring legs thereby applying outwardly biasing forces which urge said ring against the cylinder wall when said piston ring assembly is assembled in operative position in the ring groove and the piston assembled in the cylinder, said biasing forces being developed through a substantially radially inward deflection of the free ends of said spring legs by contraction of said ring to operating diameter upon said assembly of said piston ring assembly and piston in the cylinder thereby causing said spring legs to bend and to transmit through said bands bending moments to said spring strut members such that said spring strut members deflect whereby each of said spring legs and said spring strut members contributes a portion of the biasing action of the spacer-expander.

5. The ring assembly set forth in claim 4 wherein said spring strut members each have portions extending radially outwardly from said bands and an axially extending portion interconecting said radial portions radially outwardly of said bands.

6. The ring assembly set forth in claim 5 wherein said free ends of said legs are disposed radially intermediate said adjacent band and said axially extending portions of said spring strut members.

7. The ring assembly set forth in claim 6 wherein said bands are disposed along the inner periphery of said spacer-expander and said spring strut members are attached to the outer peripheries of said bands.

8. The ring assembly set forth in claim 7 wherein at least one of said spring legs is disposed between each adjacent pair of said spring strut members.

9. The ring assembly set forth in claim 8 wherein each of said legs is curved and extends axially from adjacent said remote band.

10. The ring assembly set forth in claim 7 wherein each of said legs extends radially outwardly from said remote band to the outer periphery of said spacer-expander, thence axially relative to and toward said ring and thence radially inwardly to said free end of said leg.

11. The ring assembly set forth in claim 7 wherein each of said legs extends radially outwardly from said remote band to adjacent the outer periphery of said spacer-expander and then extends at an acute angle relative to the radially extending portion of said leg to the free end of said leg.

12. The ring assembly set forth in claim 4 wherein one of said spring strut members is disposed adjacent one of said ends of said spacer-expander and another of said spring strut members is disposed adjacent the other of said ends of said spacer-expander, each of said end spring strut members having an abutment element integrally joined thereto having a flat surface extending radially and axially of the spacer-expander, said abutment elements abutting one another in face to face contact in the circumferentially abutted condition of said spacer-expander.

13. The ring assembly set forth in claim 4 wherein said bands are dished oppositely relative to one another in the free state condition of said spacer-expander and are deflected away from each other in response to inward deflection of said free ends of said legs.

14. A piston ring assembly adapted for use in the piston ring groove of a piston adapted to reciprocate in a cylinder, said piston ring assembly comprising axially spaced first and second split annular rings, a one-piece split annular spacer-expander having abuttable ends and disposed between said rings for spacing said rings in said groove, said spacer-expander comprising annular first and second bands substantially circumferentially non-compressible when said ends of the spacer-expander are abutted, said first and second bands having inner diameters larger than the diameter of the bottom of the ring groove whereby said piston ring assembly is spaced from the bottom of the piston ring groove when assembled therein, a plurality of spring strut members attached to said bands at intervals around the periphery thereof, each of said spring strut members having one end attached to one of said bands and the other end to the other of said bands, said spring strut members being adapted to axially space said bands in said groove and to axially space said rings in the groove, a plurality of spring legs arranged in first and second sets attached directly at intervals respectively to said first and second bands, each spring leg of said first set of spring legs extending axially from said first band and having its free end disposed axially beyond said second band in contact with said first ring for applying an outwardly biasing force thereto, each spring leg of said second set of spring legs extending axially from said second band and having its free end disposed axially beyond said first band in contact with said second ring for applying an outwardly biasing force thereto, said spring legs thereby applying outwardly biasing forces which independently urge said rings against the cylinder wall when said ring assembly is assembled in operative position in the ring groove and the piston is assembled in the cylinder, said biasing forces being developed through a substantially radial deflection of the free ends of said spring legs by contraction of said rings to operating diameter when said piston and ring assembly are assembled in the cylinder thereby causing said spring legs to bend and transmit through said first and second bands bending moments to said spring strut members such that said spring strut members deflect whereby each of said spring legs and said spring strut members contributes a portion of the biasing action of the spacer-expander.

15. A non-bottoming annular split one-piece spacer-expander adapted for axially spacing and radially expanding first and second piston rings when disposed in a groove of a piston with said spacer-expander, said spacer-expander having abuttable ends and comprising first and second annular bands axially spaced from one another and disposed at the inner periphery of the spacer-expander, said bands being concentric and being substantially circumferentially incompressible in the operative condition of said spacer-expander when said ends thereof are abutted, a plurality of spring struts circumferentially spaced along the outer peripheries of said bands and interconnecting said bands, each of said struts comprising axially spaced portions extending generally radially outwardly of said bands and an intermediate axially extending portion interconnecting said radial portions with the inner end of one of said radial portions connected to the other periphery of said first band and the inner end of the other radial portion to the outer periphery of the second band, a first set of spring legs circumferentially spaced along and extending from the outer periphery of said first band, said spring legs of said first set each having a free end disposed axially beyond said second band, and a second set of spring legs circumferentially spaced along and extending from the outer periphery of said second band, said spring legs of said second set each having a free end disposed axially beyond said first band, said first and second sets of spring legs being directly attached respectively to said first and second bands, said free ends of said spring legs being deflectable radially inwardly to deflect said legs and spring struts which yieldably resist said deflection and develop the ring expanding forces.

16. The spacer-expander set forth in claim 15 wherein each of said legs of said first and second sets is curved and extends axially from adjacent its respective band.

17. The spacer-expander set forth in claim 15 wherein said legs of said first and second sets extend radially outwardly from said first and second bands respectively to the outer periphery of said spacer-expander, thence axially relative to and toward the first and second rings respectively and thence radially inwardly to said free ends of said legs.

18. The spacer-expander set forth in claim 15 wherein said legs of said first and second sets extend radially outwardly from said first and second bands respectively to the outer periphery of said spacer-expander and then extend axially inwardly toward said free ends of said legs at an acute angle relative to the radially extending portions of said legs.

19. The spacer-expander set forth in claim 15 wherein said bands in the free state condition of said spacer-expander are generally oppositely dished relative to one another and in the operative condition of said spacer-expander with the rings contracted to minimum operating diameter said bands are generally parallel and lie in planes generally perpendicular to the axis of the spacer-expander in response to maximum inward deflection of said free ends of said legs, said bands being movable axially away from each other from said dished to said parallel condition in response to radially inward deflection of said legs.

20. The spacer-expander set forth in claim 15 wherein one leg of said first set of legs and one leg of said second set of legs are disposed side by side between each adjacent pair of said spring struts.

21. A piston ring assembly adapted for use in the piston ring groove of a piston adapted to reciprocate in a cylinder, said piston ring assembly comprising axially spaced first and second split annular rings, a one-piece split annular spacer-expander having abuttable ends and disposed between said rings, said spacer-expander comprising only one annular band substantially circumferentially non-compressible when said ends of the spacer-expander are abutted, said band having axially spaced longitudinally extending first and second edges and having an inner diameter larger than the diameter of the bottom of the ring groove whereby said piston ring assembly is spaced from the bottom of the piston ring groove when assembled therein, first and second sets of spacing members attached to said band at intervals around the periphery thereof, each of said spacing members of said first set having one end attached to said first edge of said band and having a portion contacting said first ring, each of said spacing members of said second set having one end attached to said second band edge and a portion contacting said second ring whereby said spacing members cooperate with said band to axially space and support said rings in the groove, a plurality of spring legs arranged in first and second sets operably connected respectively to said band at intervals therealong, each spring leg of said first set of spring legs having a portion extending radially inwardly and a portion extending axially from the inner end of the radial portion to its free end which is disposed axially beyond said second band edge in contact with said second ring for applying an outwardly biasing force thereto, each spring leg of said second set of spring legs having a portion extending radially inwardly and a portion extending axially from the inner end of the radial portion to its free end which is disposed axially beyond said first band edge in contact with said first ring for applying an outwardly biasing force thereto, said spring legs thereby applying outwardly biasing forces which independently urge said rings against the cylinder wall when said ring assembly is assembled in operative position in the ring groove and the piston is assembled in the cylinder.

22. The ring assembly as set forth in claim 21 wherein said band is cylindrical in form and disposed at the outer periphery of said spacer-expander.

23. The ring assembly as set forth in claim 22, wherein said spacing members comprise first and second sets of projections respectively joined to said first and second band edges and extending axially therefrom in opposite directions relative to one another, the projections of said first and second sets having free ends constituting said portions which contact respectively the sides of said first and second rings axially facing said spacer-expander for spacing said rings axially apart.

24. The ring assembly set forth in claim 22 wherein said first and second sets of spacing members respectively connect said first and second sets of legs to said band.

25. A non-bottoming piston ring assembly adapted for use in a piston ring groove comprising first and second split annular rings and a split annular spacer-expander disposed between said rings and having ends adapted to abut in the operative condition of said spacer-expander, said spacer-expander having an annular split band extending circumferentially of said spacer-expander and being substantially circumferentially incompressible and of sufficient diameter to space said ring assembly away from the bottom of said groove when said ends are abutted, a plurality of ring spacing ears attached to said band and extending axially between and into contact with said rings adjacent the outer peripheries thereof for axially spacing said rings in the groove, first and second sets of spring legs circumferentially spaced along and directly attached to said band, each of said legs having a radial portion extending lengthwise generally radially of said band and an axial portion extending lengthwise generally axially of said band and a free end axially offset beyond said band, said free ends of said first and second sets of legs bearing respectively against the inner peripheries of said first and second rings, said radial portions of said first set of legs being axially spaced from said radial portions of said second set of legs, said legs being oriented and proportioned to yieldably resist contraction of said rails to operating diameter and to deflect generally axially in said radial portions and generally radially inwardly in said axial portions in response to radially inward deflection of said free ends caused by contraction of said rails to operating diameter.

26. The ring assembly set forth in claim 25 wherein said band is centered axially of said spacer-expander and is disposed along the outer periphery thereof.

27. The ring assembly set forth in claim 25 wherein said band has upper and lower longitudinal edges disposed along the outer periphery of said spacer-expander adjacent but spaced axially from said first and second rings respectively, said first and second sets of legs being respectively connected to said lower and upper edges, said radial portions of said legs extending radially inwardly from said band.

28. The ring assembly set forth in claim 27 wherein said legs each have an attachment portion extending axially from the associated edge of said band dimensioned to position said radial portion of the associated leg near the one of said rings closest to said associated edge of said band.

29. The piston ring assembly set forth in claim 14 wherein said spring strut members each have portions extending radial outwardly from said bands and an axially extending portion interconnecting said radial portions radially outwardly of said bands.

30. A piston ring assembly adapted for use in the piston ring groove of a piston adapted to reciprocate in a cylinder, said piston ring assembly comprising two split annular rails and a spacer-expander providing spring action for biasing said rails outwardly against the cylinder wall and spacing said rails in said groove, said spacer-expander having two split annular substantially circumferentially non-compressible bands when assembled with the ends of the spacer-expander abutted, said bands having inner diameters larger than the diameter of the bottom of the ring groove whereby the piston ring assembly is spaced from the bottom of the piston ring groove when assembled therein, said spacer-expander also having a plurality of generally U-shaped spring strut members attached to said bands at intervals around the outer periphery thereof, each U-shaped spring strut member having one end attached to one of said bands and the other end attached to the other of said bands, each of said U-shaped members extending radially outwardly from said one band and then axially and then radially inwardly to said other band, said U-shaped spring strut members axially spacing said bands and said rails in said groove, a set of spring legs for each of said bands, each of said spring legs of the one set being attached directly to and extending axially from its respective band and having a free end extending axially beyond the other band into contact with the inner periphery of one of said rails and each of said spring legs of the other set being attached directly to and extending axially from its respective band and having a free end extending axially beyond the other band into contact with the inner periphery of the other of said rails, whereby when the piston and piston ring assembly are assembled in operative position in the cylinder said spring legs are deflected radially inwardly thereby transmitting bending moments through said bands to said spring strut members such that said spring strut members also deflect, said spring legs and said spring strut members thereby applying outwardly biasing forces to said rails.

References Cited

UNITED STATES PATENTS

| | | | |
|---|---|---|---|
| 2,394,408 | 2/1946 | Starr | 277—149 |
| 2,722,467 | 11/1955 | Olson | 277—139 X |
| 2,817,565 | 12/1957 | Heiss | 277—139 |
| 2,833,605 | 5/1958 | Shirk | 277—140 |
| 2,837,385 | 6/1958 | Mayfield | 277—140 |
| 3,081,100 | 3/1963 | Nisper | 277—140 |
| 3,181,875 | 5/1965 | Shepard | 277—140 |
| 3,190,662 | 6/1965 | Mayfield | 277—139 X |

LAVERNE D. GEIGER, Primary Examiner

JEFFREY S. MEDNICK, Assistant Examiner

U.S. Cl. X.R.

267—1.5; 277—141, 149